United States Patent
Won et al.

(10) Patent No.: US 9,929,837 B2
(45) Date of Patent: Mar. 27, 2018

(54) METHOD AND DEVICE FOR PERFORMING COORDINATION BETWEEN RADIO ACCESS POINTS IN WIRELESS COMMUNICATION SYSTEM

(71) Applicant: Samsung Electronics Co., Ltd, Gyeonggi-do (KR)

(72) Inventors: Sung Hwan Won, Gyeonggi-do (KR); Sangsoo Jeong, Gyeonggi-do (KR); Beomsik Bae, Gyeonggi-do (KR); Songyean Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 14/909,065

(22) PCT Filed: Jul. 29, 2014

(86) PCT No.: PCT/KR2014/006932
§ 371 (c)(1),
(2) Date: Jan. 29, 2016

(87) PCT Pub. No.: WO2015/016576
PCT Pub. Date: Feb. 5, 2015

(65) Prior Publication Data
US 2016/0182198 A1    Jun. 23, 2016

(30) Foreign Application Priority Data

Jul. 31, 2013 (KR) .................. 10-2013-0090567
Feb. 10, 2014 (KR) .................. 10-2014-0014917
(Continued)

(51) Int. Cl.
*H04W 4/00* (2009.01)
*H04L 5/00* (2006.01)
(Continued)

(52) U.S. Cl.
CPC ............ *H04L 5/0035* (2013.01); *H04L 5/003* (2013.01); *H04W 28/16* (2013.01); *H04W 72/0486* (2013.01); *H04W 72/0413* (2013.01)

(58) Field of Classification Search
CPC ........ H04L 5/00; H04L 1/0027; H04W 72/04; H04W 72/0406
(Continued)

(56) References Cited

U.S. PATENT DOCUMENTS 8,774,037 B2 * 7/2014 Kim ...................... H04B 7/024
370/252
8,867,466 B2   10/2014 Jang et al.
(Continued)

FOREIGN PATENT DOCUMENTS

CN    102427396 A    4/2012
EP    2806683 A1    11/2014
(Continued)

OTHER PUBLICATIONS

International Search Report dated Nov. 19, 2014 in connection with International Patent Application No. PCT/KR2014/006932, 15 pages.
(Continued)

*Primary Examiner* — Chi H Pham
*Assistant Examiner* — Alexander O Boakye

(57) ABSTRACT

The present invention relates to a method and a device for performing coordination between radio access points in a wireless communication system, and a method by which a radio access point manages a wireless resource of a terminal in a wireless communication system, according to the present invention, comprises the steps of: receiving a measurement report message transmitted from the terminal; transmitting, to a communication element, measurement-related information according to the received measurement report (Continued)

message; receiving, from the communication element, a load information message including coordination pattern information generated on the basis of the measurement-related information; and managing the wireless resource of the terminal on the basis of the received coordinated pattern information.

20 Claims, 11 Drawing Sheets

(30) Foreign Application Priority Data

Apr. 21, 2014 (KR) .................. 10-2014-0047688
Jun. 13, 2014 (KR) .................. 10-2014-0072084

(51) Int. Cl.
*H04W 28/16* (2009.01)
*H04W 72/04* (2009.01)

(58) Field of Classification Search
USPC .......................................................... 370/329
See application file for complete search history.

(56) References Cited

U.S. PATENT DOCUMENTS

| 2011/0098054 A1* | 4/2011 | Gorokhov | H04B 7/024 |
| | | | 455/452.1 |
| 2011/0256855 A1 | 10/2011 | Wang | |
| 2012/0008586 A1 | 1/2012 | Kwon et al. | |
| 2012/0099544 A1* | 4/2012 | Pajukoski | H04L 5/0032 |
| | | | 370/329 |
| 2012/0135771 A1 | 5/2012 | Futaki | |
| 2012/0230280 A1 | 9/2012 | Chandra et al. | |
| 2013/0077521 A1 | 3/2013 | Feng et al. | |
| 2013/0250872 A1* | 9/2013 | Aoki | H04W 72/0406 |
| | | | 370/329 |
| 2014/0376476 A1 | 12/2014 | Morita | |
| 2015/0263834 A1 | 9/2015 | Won et al. | |

FOREIGN PATENT DOCUMENTS

| KR | 10-2008-0061487 | 7/2008 |
| KR | 10-2008-0066778 | 7/2008 |
| KR | 10-2010-0112084 | 10/2010 |
| KR | 10-2012-0083870 | 7/2012 |
| KR | 10-2015-0010577 | 1/2015 |
| WO | 2013108902 A1 | 5/2015 |
| WO | 2015137772 A1 | 9/2015 |
| WO | 2015170812 A1 | 11/2015 |

OTHER PUBLICATIONS

Written Opinion of the International Searching Authority dated Nov. 19, 2014 in connection with International Patent Application No. PCT/KR2014/006932, 4 pages.
Barbieri, A., et al., "Coordinated Downlink Multi-Point Communications in Heterogeneous Cellular Networks," IEEE Information Theory and Applications Workshop, Feb. 5, 2012, pp. 7-16.
"An Issue on Overhead for Downlink Joint Processing," 3GPP TSG RAN WG1 #56, R1-090599, Hitachi, Ltd., Athens Greece, Feb. 9-13, 2009, 2 pages.
"Centralized and Distributed CoMP Procedures," 3GPP TSG-RAN WG3 Meeting #84, R3-141224, LG Electronics, Seoul, South Korea, May 19-23, 2014, 7 pages.
"Introduction of Inter-eNB CoMP Signaling," 3GPP TSG-RAN WG3 Meeting #84, R3-141246, Samsung, China Telecomm, CMCC, and China Unicom, Seoul, South Korea May 19-23, 2014, 44 pages.
Foreign Communication From a Related Counterpart Application, European Application No. 14833018.6-1857, Extended European Search Report dated Mar. 15, 2017, 14 pages.

* cited by examiner

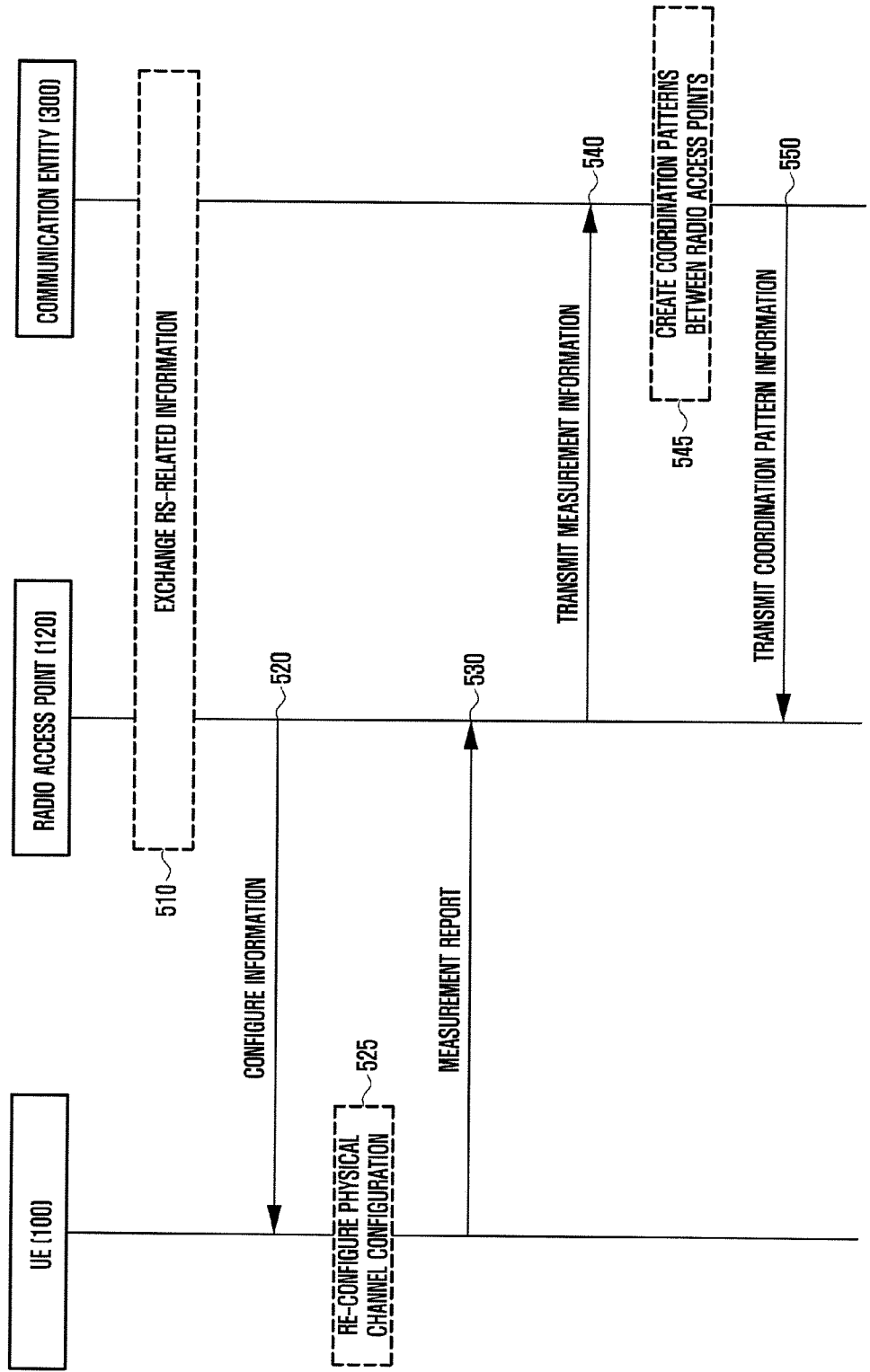

METHOD AND DEVICE FOR PERFORMING COORDINATION BETWEEN RADIO ACCESS POINTS IN WIRELESS COMMUNICATION SYSTEM

CROSS-REFERENCE TO RELATED APPLICATION(S)

The present application claims priority under 35 U.S.C. § 365 to International Patent Application No. PCT/KR2014/006932 filed Jul. 29, 2014, entitled "METHOD AND DEVICE FOR PERFORMING COORDINATION BETWEEN RADIO ACCESS POINTS IN WIRELESS COMMUNICATION SYSTEM", and, through International Patent Application No. PCT/KR2014/006932, to Korean Patent Application No. 10-2013-0090567 filed Jul. 31, 2013, Korean Patent Application No. 10-2014-0014917 filed Feb. 10, 2014, Korean Application No. 10-2014-0047688 filed Apr. 21, 2014, and Korean Patent Application No. 10-2014-0072084 filed Jun. 13, 2014, each of which are incorporated herein by reference into the present disclosure as if fully set forth herein.

TECHNICAL FIELD

The present invention relates to wireless communication systems, and more particularly, to a method and device for making coordination between radio access points in a wireless communication system.

BACKGROUND ART

Early wireless communication systems were developed to provide voice call services, supporting the activity of users. The fields of use for the wireless communication systems have extended to providing data services or high speed data services, beyond providing voice services.

FIG. 1 is a diagram showing a general wireless communication system. Referring to FIG. 1, the wireless communication system is capable of including user equipment (UE) 100, Radio Access Network (RAN) 130 and core network 140.

The RAN 130 may be divided into several entities: one of which is an entity 120 for interacting with the UE 100 through a wireless interface 110; and the others of which are entities connected to each other via wires in the wireless communication system. Examples of the entity 120 for interacting with the UE 100 through a wireless interface 110 are evolved Node B (eNB), Node B (NB) or Radio Network Subsystem (RNS) including NB, Base Transceiver Station (BTS) or Base Station Subsystem (BSS) including BTS, wireless access point, Home eNB, Home NB, Home eNB Gateway (GW), X2 GW, etc. In this description, for the sake of convenience, the term, radio access point, is called the RAN 130 or at least one of the examples of the entity 120, listed above.

Except for some exceptions, the radio access point 120 generally includes one or more cells each of which controls a specific range of coverage within which the UE 100 receives corresponding services. The cell refers to a cell of a general cellular system. The radio access point 120 refers to a device that manages and controls the cells. In this description, for the sake of convenience, the radio access point 120 may be used in the sense of 'cell.' In addition, when describing an object (e.g., embodiment), for the sake of convenience, the terms 'cell' and 'radio access point 120' may be used together.

The core network 140 is capable of including an RAN control entity 135. The RAN control entity 135 is in charge of general control functions, such as mobility management, authentication, security, etc. Examples of the RAN control entity 135 are Mobility Management Entity (MME), Serving GPRS Support Node (SGSN), etc. GPRS is short for General Packet Radio Service.

The radio access point 120 provides services to UE 100 through a wireless interface 110. To this end, each radio access point 120 has a proper range of coverage for providing services.

FIG. 2 is a diagram showing a case where one or more radio access points 120 have an overlapping coverage 220.

Two general radio access points 120a and 120b adjacent to each other have coverages 210a and 210b respectively. In this case, there may be an overlapping coverage 220 generated as the two coverages 210a and 210b are overlapped. When UE 100 receives services in the overlapping coverage 220, it may be susceptible to interference. For example, when UE 100 receives a service from a radio access point 120a in the overlapping coverage 220, it may be susceptible to interference by the radio access point 120b.

The embodiment shown in FIG. 2 is implemented in such a way that the radio access points 120a and 120b have the coverages 210a and 210b similar in area to each other; however the present invention is not limited by the size of coverage. In addition, it will be appreciated that there may be various types of overlapping coverages where interference occurs, e.g., a case where the coverage 210a of the radio access point 120a is located within the coverage 210b of the radio access point 120b, a case where two or more overlapping coverages 220 are generated as the coverages of two or more radio access points 120 are overlapped, etc.

In addition to occurrence of interference, the overlapping coverage 220 may also cause frequent signaling. An example of the signaling is a handover-related signaling.

In order to resolve the problems, the 3rd Generation Partnership Project (3GPP) group has recently developed a technology for a number of radio access points 120 to make cooperative communication with each other. Examples of the cooperative communication technology are Coordinated Multi-Point Transmission and Reception (CoMP), Carrier Aggregation, etc.

DISCLOSURE OF INVENTION

Technical Problem

However, there may be coexistence of UE that supports a Coordinated Multi-Point Transmission and Reception (CoMP) technology and UE that does not support a CoMP technology within a coverage to which a radio access point provides services. In the following description, the UE that supports a CoMP technology refers to UE suitable for reporting various interference environments, and the UE that does not support a CoMP technology refers to UE that are not suitable for reporting various interference environments.

The present invention has been made in view of the above problems, and provides a method and device that improves a process for exchanging coordination-related information between radio access points and a process for setting a reference signals (RS) to UE, and allows a radio access point servicing UE not suitable for reporting various interference environment to harmoniously participate in coordination between radio access points.

Solution to Problem

In accordance with an embodiment of the present invention, the present invention provides a method for a radio access point to manage wireless resources of a terminal in a wireless communication system, comprising: receiving a measurement report message from the terminal; transmitting, to a communication entity, measurement-related information regarding according to the received measurement report message; receiving, from the communication entity, a load information message including information regarding coordination patterns created based on the measurement-related information; and managing the wireless resources of a terminal based on the received information regarding coordination patterns.

In accordance with another embodiment of the present invention, the present invention provides a radio access point for managing wireless resources of a terminal in a wireless communication system, comprising: a transceiver for transmitting/receiving signals; a controller for: receiving a measurement report message from the terminal; transmitting, to a communication entity, measurement-related information regarding according to the received measurement report message; receiving, from the communication entity, a load information message including information regarding coordination patterns created based on the measurement-related information; and managing the wireless resources of a terminal based on the received information regarding coordination patterns.

In accordance with another embodiment of the present invention, the present invention provides a method for a communication entity to make coordination between radio access points in a wireless communication system, comprising: receiving measurement-related information transmitted from a radio access point; creating information regarding coordination patterns based on the measurement-related information; and transmitting, to the radio access point, a load information message including the information regarding coordination patterns.

In accordance with another embodiment of the present invention, the present invention provides a communication entity to make coordination between radio access points in a wireless communication system, comprising: a transceiver for transmitting/receiving signals; and a controller for: receiving measurement-related information transmitted from a radio access point; creating information regarding coordination patterns based on the measurement-related information; and transmitting, to the radio access point, a load information message including the information regarding coordination patterns.

Advantageous Effects of Invention

The method and device according to the present invention exchange coordination-related information between radio access points in a wireless communication system, thereby enabling UE not suitable for reporting various interferences to harmoniously participate in coordination between the radio access points, as well as UE suitable for reporting various interferences.

BRIEF DESCRIPTION OF DRAWINGS

FIG. 5 is a flow diagram showing a first embodiment of the present invention;

MODE FOR THE INVENTION

Figure 1:
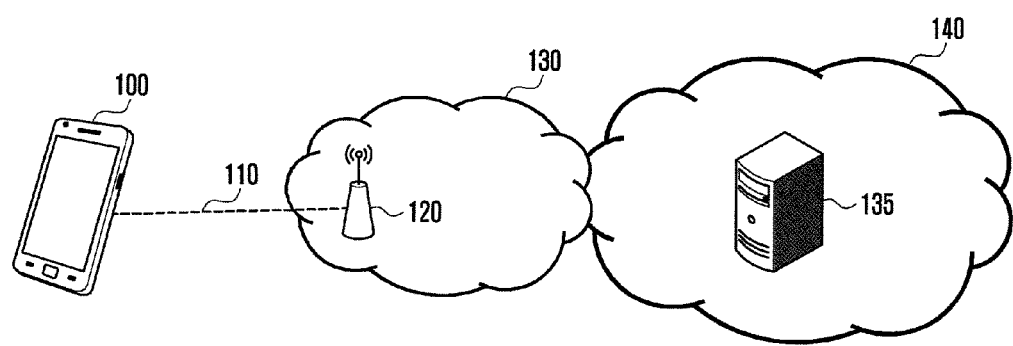
FIG. 1 is a diagram showing a general wireless communication system.

Embodiments of the present invention are described in detail with reference to the accompanying drawings. In the drawings, the same or similar elements are denoted by the same reference numerals even though they are depicted in different drawings. In the following description, a detailed description of known functions, configurations, and operations incorporated herein will be omitted when it may make the subject matter of the invention less clear.

Although the following disclosure describes the embodiments of the present invention based on Long Term Evolution (LTE) and Evolved Packet Core (EPC), as a core network, and Radio Access Network defined in the specification of 3GPP, it should be understood that the subject matter of the present invention can also be applied to other communication systems that have similar technical backgrounds to the present invention. It will be also appreciated to those skilled in the art that the embodiments may be modified and the modifications may also be applied to other communication systems, without departing from the scope of the present invention.

In order to make smooth coordination between radio access points, the method and device according to embodiments of the present invention considers UE having various features. More specifically, although a radio access point servicing UE not suitable for reporting various interference environments participates in coordination between radio access points, the method and device according to the present invention is capable of effectively making coordination between radio access points.

Figure 3:
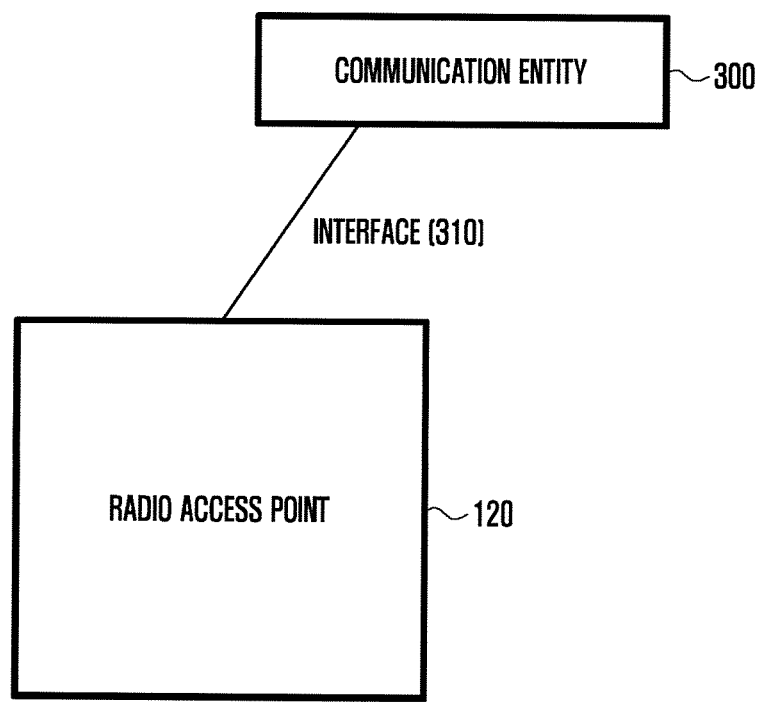
FIG. 3 is a diagram showing a configuration capable of exchanging coordination-related information between radio access points.

FIG. 3 is a diagram showing a configuration capable of exchanging coordination-related information between radio access points.

Figure 2:
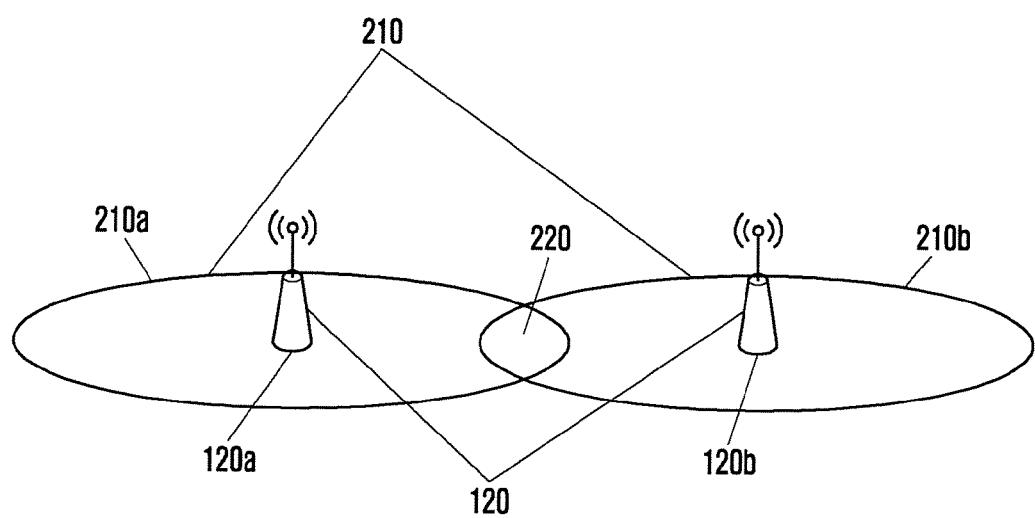
FIG. 2 is a diagram showing a case where one or more radio access points 120 have an overlapping coverage 220.

In order to control a problem that may be caused by the overlapping coverage 220, described above referring to FIG. 2, one or more radio access points 120 need(s) to exchange, with each other, information related to UE 100 to which the radio access points 120 are providing services. Since there are, in general, a number of radio access points in the vicinity of one radio access point 120, it may be advantageous that the radio access point 120 exchanges, with as many radio access points as possible, information about UE 100 that they are providing services. FIG. 3 shows a configuration designed to be proper so that the radio access point 120 exchanges, with a relatively large number of radio access points, information about UE 100 that they are providing services.

The communication entity 300 is connected to one or more radio access points 120 through a proper interface 310, and is capable of performing at least one of the following processes:

receiving, from one or more radio access points 120, information about at least one of the radio access points 120 and UE 100 that they are providing services to; and transmitting, to one or more radio access points 120, information about at least one of the radio access points 120 and UE 100 that they are providing services to.

The communication entity 300 may be a predefined existing entity or a new entity. Examples of the predefined existing entity are MME, SGSN, Radio Network Controller (RNC), Evolved Serving Mobile Location Centre (E-SMLC), radio access point (including eNB, Node B, etc.), OAM, etc.

The proper interface 310 may vary according to types of communication entity 300. For example, when the communication entity 300 is a radio access point, the interface 310 may be X2 interface (X2-C or X2-U). When the communication entity 300 is a new type of entity, the interface 310 may be a new type of interface defined to comply with the new communication entity.

In addition, when the communication entity 300 is a radio access point, it may need network configurations in order to distinguish the functions from those of the other radio access point 120. That is, when the communication entity 300 is a radio access point, it may require an environment where network configurations have been well established.

Although it is not shown in FIG. 3, the radio access point 120 and the communication entity 300 are each capable of include a transceiver and a controller.

The transceiver of the radio access point 120 is capable of transmitting/receiving signals to/from UE or the communication entity 300. According to an embodiment, the transceiver of the radio access point 120 is capable of transmitting/receiving signals to/from UE via a wireless channel and to/from the communication entity 300 via a wired or wireless channel.

The controller of the radio access point 120 is capable of controlling signals flowing between blocks to perform operations according to the following first or second embodiment. For example, the controller of the radio access point 120 according to a first embodiment of the present invention is capable of exchanging information regarding a reference signal with a communication entity connected to the radio access point, and transmitting, to UE, channel measurement setup information for measuring a channel for the UE, based on the information regarding a reference signal. The controller of the radio access point 120 is also capable of transmitting, to the communication entity, channel measurement information transmitted from the UE and measurement information regarding Sounding Reference Signal (SRS) (SRS measurement information) transmitted from the UE. Although the embodiment described the feature of the controller in such a way as to transmit the SRS measurement information to the communication entity, it should be understood that the controller does not necessarily transmit the SRS measurement information to the communication entity, and this logic can also be applied to the following description.

The controller of the radio access point 120 according to a second embodiment of the present invention is capable of: receiving, from UE, information regarding a condition as to whether the UE performs roaming or participates in coordination between radio access points; creating information related to division of wireless resources, based on the received information; and transmitting the created information to the communication entity. The controller of the radio access point 120 is also capable of: receiving, from the communication entity, pattern information regarding coordination between radio access points, created on the basis of the wireless resource division-related information; and scheduling the UE based on the pattern information regarding coordination between radio access points.

The controller of the radio access point 120 according to an embodiment of the present invention is capable of: receiving a measurement report message from the UE; and transmitting, to the communication entity, measurement-related information according to the received measurement report message. The controller of the radio access point 120 is capable of: receiving, from the communication entity, a load information message including the coordination pattern information created on the basis of the measurement-related information; and managing wireless resources of the UE based on the received coordination pattern information.

The transceiver of the communication entity 300 is capable of transmitting/receiving signals to/from the radio access point 120 via a wired or wireless channel.

The controller of the communication entity 300 is capable of controlling signals flowing between blocks to perform operations according to the following first or second embodiment. For example, the controller of the communication entity 300 according to a first embodiment of the present invention is capable of: exchanging information regarding a reference signal with the radio access point connected to the communication entity; and receiving, from the radio access point, channel measurement information transmitted from UE, and measurement information regarding Sounding Reference Signal (SRS) (SRS measurement information) transmitted from the UE. The controller of the communication entity 300 is capable of: creating information at least one pattern regarding coordination between radio access points, based on the SRS measurement information; and transmitting the created coordination pattern information to the radio access point.

The controller of the communication entity 300 according to a second embodiment of the present invention is capable of: receiving, from the radio access point, information related to division of wireless resources; and creating pattern information regarding coordination between radio access points based on the received wireless resource division-related information. The controller of the communication entity 300 is capable of transmitting the created pattern information to the radio access point.

The controller of the communication entity 300 according to an embodiment of the present invention is capable of: receiving measurement-related information from the radio access point; creating coordination pattern information based on the measurement-related information; and transmitting, to the radio access point, a load information message including the coordination pattern information.

Figure 4A:
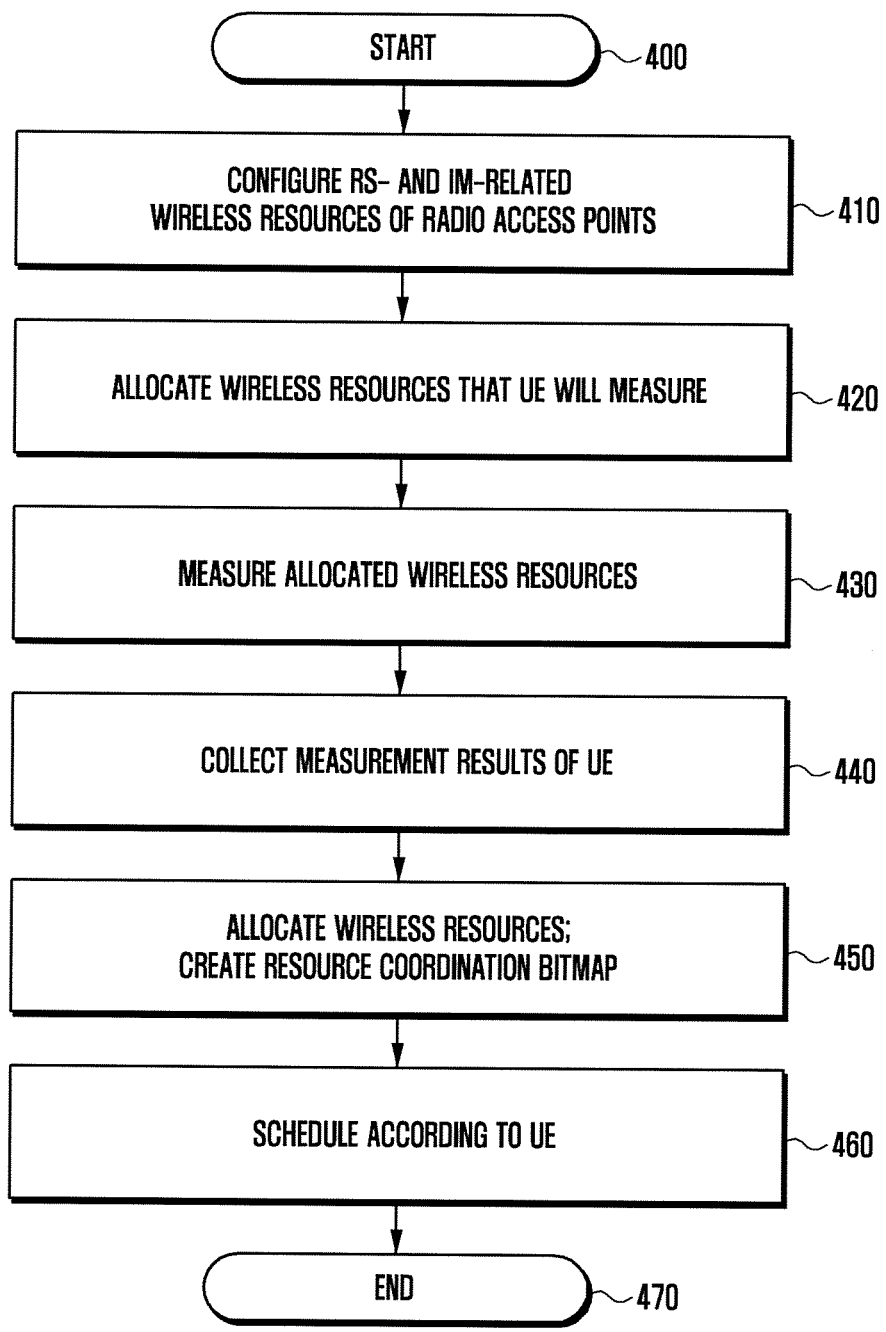
FIGS. 4a and 4b are flow diagrams that describe a method of making coordination between radio access points.
Figure 4B:
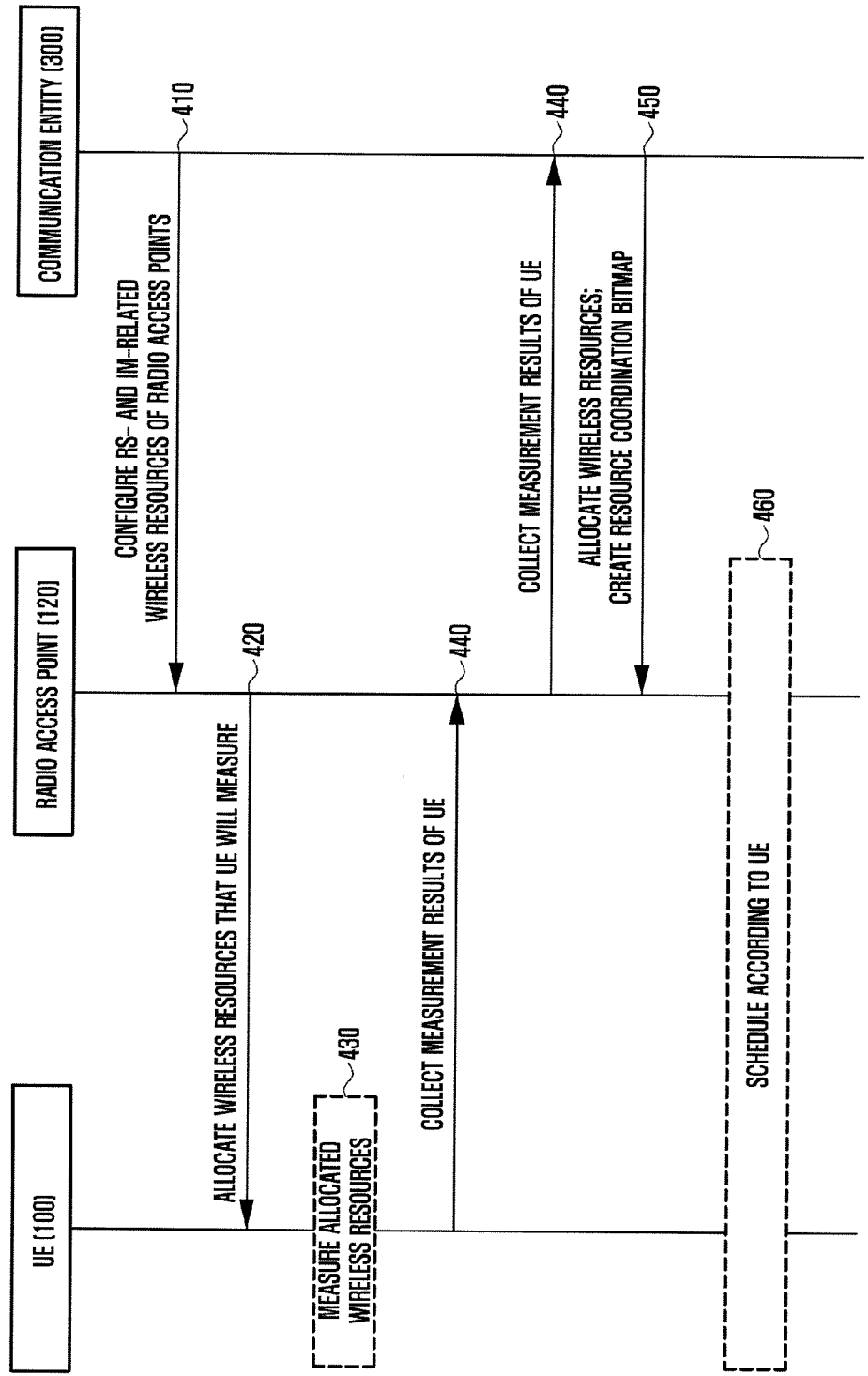

FIGS. 4a and 4b are flow diagrams that describe a method of making coordination between radio access points. FIGS. 4a and 4b will use the same reference numbers for the same operations.

Without considering coordination between radio access points, the radio access point 120 performs allocation of wireless resources, based on a state of UE 100 to which the radio access point 120 is providing services. On the contrary, when radio access points are coordinated with each other, the radio access point 120 is capable of performing allocation of wireless resources, based on states of UE 100 to which other radio access points are providing services as well as a state of UE 100 to which the radio access point 120 is providing services, in order to improve the entire performance of the radio access points.

The state of UE 100 may be represented by a combination of a number of factors. Typically, the state of UE may include at least one of the following: a channel state of UE 100, an interference condition, an amount of Uplink (UL) data that have already been transmitted, an amount of UL data in a buffer to be transmitted, an amount of Downlink (DL) data that have already been received, and an amount of DL data in a buffer to be received. The channel state of UE 100 may be obtained from the measurement result of RS. The interference condition may be obtained from the measurement result of the Interference Measurement (IM) resource.

In order to improve the entire performance of a number of radio access points 120, the radio access points 120 may show various patterns of coordination in a specific time and a specific frequency band. An example of the coordination pattern may be a state where, for a corresponding time and frequency band, some of the BTSs do not allocate wireless resources and another part of the BTSs allocate wireless resources. In order to determine a coordination aspect, knowledge (e.g., information) is needed about the interference condition and the channel state of the UE 100 which are predicted for various patterns of coordination.

The coordination between radio access points 120 may include the following four processes:
- properly setting RS- and IM-related wireless resources so that UE 100 can measure various channel states and interference conditions;
- transmitting, by UE 100, information regarding a channel state and/or an interference condition by using properly set RS- and IM-related wireless resources (or, further, editing information transmitted from UE 100 and/or transmitting the information to communication entity 300);
- forming an interference coordination pattern based on information regarding an interference condition and a channel state and of UE; and
- transmitting an interference coordination pattern to the radio access point 120 and scheduling UE 100 based on the interference coordination pattern.

Referring to FIGS. 4*a* and 4*b*, the method of making coordination between radio access points is described as follows.

The communication entity 300 is capable of transmitting establishment information regarding RS- and IM-related wireless resources for radio access points to the radio access point 120 in operation 410. For various situations, in order to detect the interference condition and the channel state of the UE 100, eNBs 120 need to be coordinated with each other, to transmit RS, and to allocate IM resources. When the eNB 120 transmits RS and allocates IM resources, without considering the conditions of the surrounding eNBs, and the UE 100 receives the RS- and IM-related information and makes measurement through corresponding resources, it is difficult to detect the interference condition and the channel state of the UE 100 in a corresponding condition (or coordination pattern).

The radio access point 120 allocates wireless resources that UE 100 will measure in operation 420. The allocation of wireless resources that UE 100 will measure may be performed by one or more of the following: an RRC connection reconfiguration message, RRCConnectionReconfiguration, an RRC connection re-establishment message, RRCConnectionReestablishment, and an RRC connection setup message, RRCConnectionSetup. More specifically, the allocation of wireless resources may be performed as the radio access point 120 transmits the physical configuration dedicated IE (physicalConfigDedicated IE) of the message to the UE 100.

The UE 100 properly re-configures physical channel configuration based on the physicalConfigDedicated IE in operation 430. After that, the UE 100 measures the interference condition and the channel state according to the re-configured, physical channel configuration.

The UE 100 is capable of providing the measurement report to the radio access point 120, based on the measured channel state and interference condition in operation 440. The measurement report may be reported to the radio access point 120 through PUCCH or PUSCH. The measurement report transmitted from the UE 100 to the radio access point 120 may include at least one of the following: Channel State Information (e.g., CQI, PMI, and RI), Reference Signal Received Power (RSRP) regarding a reference signal of a particular cell, and a benefit metric.

In addition, the radio access point 120 is capable of transmitting, to the communication entity 300, the information received from the UE 100, with or without processing the received information. The information that the radio access point 120 transmits to the communication entity 300 may include at least one of the following, which may be called measurement-related information:
- a measurement result by UE 100 from resources configured in channel state information-reference signal-configuration (CSI-RS-Config);
- a measurement result by UE 100 from resources configured in channel state information-reference signal configuration of zero transmission power (CSI-RS-ConfigZP);
- a measurement result by UE 100 from resources configured in demodulation reference signal-configuration (DMRS-Config);
- a measurement result of cell specific reference signal (CRS) by UE 100; and
- a measurement result by UE 100 from resources configured in channel state information-interference measurement configuration (CSI-IM-Config).

The communication entity 300 is capable of transmitting a coordination pattern to the eNB 120 in operation 450.

The eNB 120 manages wireless resources of the UE 100 based on the received coordination pattern in operation 460.

Release 11 of 3GPP allows UE to report the results measured from more Resource Element (RE) or more RE set or group than UE before Release 11, so that the UE 100 can make a report for various channel states and interference conditions. It should be understood that one RE set or group may refer to one RE. That is, one RE set or group may include at least one RE. More specifically, UE of Transmission Mode (TM) 10 may report the measurement result about at least one of the following:
- Maximum three CSI-RS RE sets or groups, configured to use non-zero transmission power;
- Maximum four CSI-RS RE sets or groups, configured to use zero transmission power; and
- Maximum three CSI-IM RE sets or groups.

On the contrary, UE less than TM 9 do not support CSI-IM RE set or group and a number of CSI-RS RE sets or groups. UE of TM 9 may report the measurement result from one RE set or group configured as csi-RS-r10.

As described above, it may be important to detect information about the interference condition and channel state of UE 100 with various patterns of coordination in order to make coordination between radio access points 120. The communication entity 300 needs to detect the interference condition and channel state of UE 100, in order to calculate a proper coordination pattern based on the detections.

However, UE 100 before Release 10, i.e., Release 9, cannot report the channel state and interference condition that they are faced with, under various coordination patterns. Therefore, a system is required to resolve the problems.

In the following description, a first embodiment of the present invention is explained in detail.

In the first embodiment of the present invention, the communication entity 300 is capable of obtaining information related to interference conditions and/or channel states in various conditions of the UE 100. More specifically, the communication entity 300 is capable of obtaining information related to interference conditions and/or channel states regarding UE before Release 10, i.e., UE less than TM 9. The various situations may refer to coordination patterns.

FIG. 5 is a flow diagram showing a first embodiment of the present invention.

In the first embodiment of the present invention, the communication entity 300 is capable of obtaining information related to interference conditions and/or channel states regarding with various coordination patterns for UE 100 less than TM 9 as well.

The communication entity 300 and the radio access point 120 exchange information regarding RS with each other in operation 510. The exchanged information may be information related to CSI-RS and/or SRS.

For a case that information related to CSI-RS is exchanged, the process is described in detail as follows.

The communication entity 300 and the radio access point 120 exchange CSI-RS related information with each other in operation 510, so that the radio access point 120 can properly configure wireless resources allocated to the UE 100, i.e., one or more of the following: CSI-RS-NZP, CSI-RS-ZP, CSI-IM, csi-RS-r10, and zeroTxPowerCSI-RS-r10, in operations following operation 510. CSI-RS-NZP refers to CSI-RS configured to use non-zero transmission power. CSI-RS-ZP refers to CSI-RS configured to use zero transmission power.

In general, the radio access point 120 may transmit RS from wireless resources configured to csi-RS-r10 and CSI-RS-NZP and may not transmit RS from wireless resources configured to zeroTxPowerCSI-RS-r10, CSI-RS-ZP and CSI-IM. UE 100 may measure channel characteristics from wireless resources allocated to CSI-RS-NZP or csi-RS-r10, according to the TM number, and may report the measurement result. UE 100 may also measure interference conditions from wireless resources allocated to CSI-RS-IM and may report the measurement result.

The communication entity 300 is capable of transmitting CSI-RS configuration-related information to the radio access point 120 in operation 510. The CSI-RS configuration-related information will be described in detail in the following paragraph. The CSI-RS configuration-related information may be transmitted according to cells.

The radio access point 120 is capable of performing physical channel establishment considering the CSI-RS configuration-related information. More specifically, the radio access point 120 is capable of configuring CSI-RS considering the CSI-RS configuration-related information. For example, the radio access point 120 may determine RE sets or groups to use CSI-RS or RE sets or groups not to use CSI-RS.

The CSI-RS configuration-related information may refer to CSI-RS information configured by the communication entity 300 or CSI-RS information that requests or commands the radio access point 120 to make a configuration according to the information. When the CSI-RS configuration-related information is CSI-RS information configured by the communication entity 300, the radio access point 120 may transmit its configured CSI-RS information. When the CSI-RS configuration-related information is CSI-RS information that requests or commands the radio access point 120 to make a configuration according to the information, the radio access point 120 may transmit a message showing success or failure, as a response to the request or command.

The CSI-RS configuration-related information may include at least one of the following: {at least one of the following: antennaPortsCount, resourceConfig, subframeConfig, scramblingldnetity, and qcl-CRS-Info, which correspond to CSI-RS-NZP}, {at least one of the following: resourceConfig and subframeConfig, which correspond to CSI-RS-ZP}, {at least one of the following: antennaPortsCount, p-C, resourceConfig, and subframeConfig, which correspond to csi-RS-r10}, {at least one of the following: zeroTxPowerResourceConfigList and zeroTxPowerSubframeConfig, which correspond to zeroTxPowerCSI-RS-r10} and {at least one of the following: resourceConfig and subframeConfig, which correspond to CSI-IM}. Simply, the information may include at least one of the following: {resourceConfig and/or subframeConfig describing wireless resources to transmit RS} and {resourceConfig and/or subframeConfig describing wireless resources not transmit RS}.

For example, when the CSI-RS configuration-related information describes wireless resources not to transmit RS, the CSI-RS configuration-related information may be transmitted in the forms as shown in the following tables 1 and 2. It should be understood that the CSI-RS configuration-related information may also be transmitted in a form that differs from part or all of the forms of tables 1 and 2.

TABLE 1

| IE/Group Name | Presence | Range | Semantics description | Criticality | Assigned Criticality |
|---|---|---|---|---|---|
| CSI-RS-ZP Information | | n . . . <maxCSI-RS-ZP-r11> | | YES | ignore |
| > Resource Configuration | M | | ZeroPowerCSI-RS defined in TS 36.213 | YES | ignore |
| > Subframe Configuration | M | | defined in TS 36.211 | YES | ignore |

TABLE 2

| Range bound | Explanation |
| --- | --- |
| maxCSI-RS-ZP-r11 | Maximum no. of configurable CSI-RS ZPs. Value is 4. |

In the foregoing tables, transmission of the CSI-RS-ZP related information is described as examples. In addition, CSI-IM related information may also be transmitted as in the following tables 3 and 4. It should be understood that the CSI-RS configuration-related information may be transmitted in a form that differs from part or all of the forms of tables 3 and 4.

TABLE 3

| IE/Group Name | Presence | Range | Semantics description | Criticality | Assigned Criticality |
| --- | --- | --- | --- | --- | --- |
| CSI-IM Information | | n . . . <maxCSI-IM-r11> | | YES | ignore |
| > Resource Configuration | M | | CSI-RS configuration parameter defined in TS 36.211 and TS 36.213 | YES | ignore |
| > Subframe Configuration | M | | defined in TS 36.211 | YES | ignore |

TABLE 4

| Range bound | Explanation |
| --- | --- |
| maxCSI-RS-ZP-r11 | Maximum no. of configurable CSI-IM resources. Value is 3. |

In the tables 1 and 3, n is an integer (e.g., 0 or 1).

The CSI-RS configuration-related information may be transmitted via an existing message or a newly defined message. Examples of the existing message are X2AP: LOAD INFORMATION, X2AP: ENB CONFIGURATION UPDATE, X2AP: ENB CONFIGURATION UPDATE ACKNOWLEDGE, X2AP: X2 SETUP REQUEST, X2AP: X2 SETUP RESPONSE, X2AP: RESOURCE STATUS REQUEST, etc.

According to the embodiment of the present invention, the following description explains the transmission of information regarding Sounding Reference Signal (SRS) and/or pattern information regarding coordination between radio access points in operation 510 shown in FIG. 5.

CSI-RS refers to an RS transmitted by the radio access point 120. SRS refers to an RS transmitted by the UE 100. SRS supports functions of UE 100 regardless of UE versions. When using SRS, although UE is not UE of TM 10, interference conditions and/or channel states of the UE 100 according to various situations can be estimated.

For example, when the radio access point 120 servicing the UE 100 measures a high level of SRS transmission power, it is capable of predicting that the UE 100 is in a good channel state. When a particular radio access point that does not service the UE 100 measures a high level of SRS transmission power, the radio access point is capable of predicting that the UE 100 receives serious interference from the radio access point.

It is important to make a configuration so that a number of UE devices receiving services from a number of radio access points can use SRSs via different individual wireless resources. When two UE devices use SRSs via the same wireless resource, the SRRs of the two UE devices are combined. Therefore, the individual inherent situations of the UE devices cannot be inferred. In addition, the voices from the UE devices are also mixed and this causes an unreliable result.

The radio access point 120 is capable of transmitting a message notifying information related to the number of UE devices to the communication entity 300 in operation 510. The information related to the number of UE devices may refer to one of the following: the number of UE devices that the radio access point 120 provides services to, the number of UE devices in a connection mode from among the UE devices that the radio access point 120 provides services, and the number of UE devices to which SRS resources are allocated from among the UE devices that the radio access point 120 provides services. The communication entity 300 allows the radio access point 120 to allocate SRS resources to the UE 100 that the radio access point 120 is capable of providing services, based on the information related to the number of UE devices. That is, the radio access point 120 receives, from the communication entity 300, information regarding SRS resources allocated on the basis of the number of UE devices.

Figure 6:
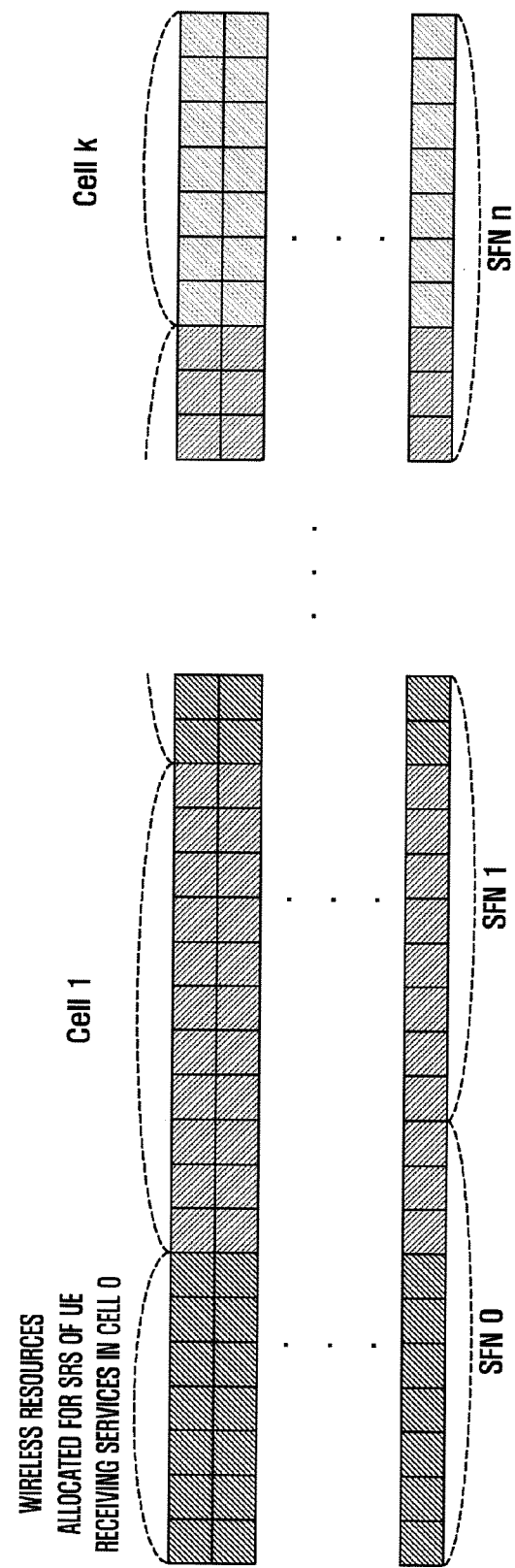
FIG. 6 is a diagram showing a method for a communication entity 300 to allocate wireless resources to a number of radio access points.

FIG. 6 is a diagram showing a method for a communication entity 300 to allocate wireless resources to a number of radio access points.

Referring to FIG. 6, the larger the number of UE devices that a radio access point informs, the more the radio access point obtains the amount of wireless resources. Since the period of time of a System Frame is 10 ms, SRS resources are repeatedly allocated at a period of (n+1)×10 ms, as shown in FIG. 6. As described above, since it is assumed that the terms 'cell' and 'radio access point' are used in the same sense, it should be understood that the radio access point is expressed in the description for the embodiment and refers to 'cell' shown in FIG. 6. It should be understood that allocation of SRS is not necessarily performed in such a way that one radio access point has completed allocation and then the following radio access point performs allocation as shown in FIG. 6. As an example, different radio access points are allocated to individual subframes, respectively. As another example, Resource Block Group or two consecutive Resource Blocks in one subframe are allocated to radio access points that differ from each other.

The radio access point 120 configures one or more of the following: CSI-RS-NZP, CSI-RS-ZP, CSI-IM, csi-RS-r10, zeroTxPowerCSI-RS-r10, and SRS in operation 520. To this end, the radio access point 120 may use information obtained from the communication entity 300 in operation 510. The configuration may be performed by using one or more of the following messages: RRCConnectionReconfiguration, RRCConnectionReestablishment, and RRCConnectionSetup. More specifically, the configuration may be performed as the radio access point 120 transmits physicalConfigDedicated IE of the message to the UE 100.

physicalConfigDedicated IE includes CSI-RS-Config-r10, Sounding RS-UL-ConfigDedicated-v1020, SoundingRS-UL-ConfigDedicatedAperiodic-r10, CSI-RS-ConfigNZPToReleaseList-r11, CSI-RS-ConfigNZPToAddModList-r11, CSI-RS-ConfigZPToReleaseList-r11, CSI-RS-ConfigZPToAddModList-r11, CSI-IM-ConfigToReleaseList-r11, CSI-IM-ConfigToAddModList-r11, etc. physicalConfigDedicated IE allows the UE 100 to configure CSI-RS and SRS.

The UE 100 properly re-configures physical channel configuration, based on physicalConfigDedicated IE in operation 525. The UE 100 measures the interference conditions and channel states according to the re-configured physical channel configuration.

The UE 100 is capable of providing the measurement report to the radio access point 120, based on the measured channel state and interference condition in operation 530. The measurement report may be transmitted through PUCCH or PUSCH. According to an embodiment of the present invention, the UE 100 is capable of providing the measurement report to the radio access point 120 periodically or non-periodically. When the UE 100 reports the measurement report non-periodically, the radio access point 120 is capable of instructing the UE 100 for the report request of the channel state or interference condition via Downlink Control Information.

The radio access point 120 is capable of transmitting, to the communication entity 300, the information received from the UE 100, with or without processing the received information. The information that the radio access point 120 transmits to the communication entity 300 may include at least one of the following:

measurement result by UE 100 from resources configured in CSI-RS-Config;
measurement result by UE 100 from resources configured in CSI-RS-ConfigNZP;
measurement result by UE 100 from resources configured in CSI-RS-ConfigZP;
measurement result by UE 100 from resources configured in DMRS-Config;
measurement result of CRS by UE 100;
measurement result by UE 100 from resources configured in CSI-IM-Config; and
result of a combination of the measurement result by UE 100 from resources configured in CSI-IM-Config and the measurement result by UE 100 from resources configured in CSI-RS-ConfigNZP.

In addition, the radio access point 120 according to embodiments of the present invention is capable of transmission of SRS information (e.g., SRS power information) measured from the UE.

The following table 5 shows an example of message content transmitted in operation 540. For example, part or all of the information described in table 5 may be transmitted from the radio access point 120 to the communication entity 300 in operation 540.

TABLE 5

| IE | Range |
| --- | --- |
| Subframe index | |
| Cell-Specific CoMP Info | 1 . . . <maxCellineNB> |
| >ECGI | |
| >UE-Specific CoMP Info | 1 . . . <maxnoofUEstobeScheduled> |
| >>UE ID | |

TABLE 5-continued

| IE | Range |
| --- | --- |
| >>CSI Report | 1 . . . <maxnoofCSI-RSProc> |
| >>>Resource Indicator | 0 . . . <maxnoofResourceCombination> |
| >>>CQI | |
| >>>PMI | |
| >>>RI | |
| >>Measurement Report | |
| >>User Perceived Throughput | |
| >Measured SRS Power | |

Information Element (IE) of Subframe index may refer to a time index informing a time (e.g., a subframe) that a message is transmitted in the operation.

Information by individual cell (Cell-Specific CoMP Info IE) that belonged to the following radio access point 120 may be transmitted.

The information by individual cell (Cell-Specific CoMP Info IE) may include at least one of the following:
cell identifier (ECGI IE);
information by UE (UE-Specific CoMP Info IE);
SRS power measured in a cell (Measured SRS Power IE).
The information by UE (UE-Specific CoMP Info IE) may include at least one of the following:
UE identifier (UE ID IE);
CSI report (CSI Report IE)
measurement report (Measurement Report IE);
user perceived throughput (User Perceived Throughput IE).

The CSI Report IE may include at least one of the following: Channel Quality indicator (CQI), Precoding Matrix Index (PMI), and Rank Index (RI). When the UE 100 is UE less than TM 9, it may not need Resource Indicator IE. When the UE 100 is UE greater than TM 10 and is capable of transmission of CSI report by a combination of a CSI-RS resource and a CSI-IM resource, Resource Indicator IE may be an indicator indicating one or more CSI-RS resources and/or one or more CSI-IM resources. Each resource may include one or more Resource Configuration IE and/or one or more Subframe Configuration IE. The measurement report may include RSRQ IE or RSRP IE that the UE 100 measures for various types of cells as well as a serving cell.

The communication entity 300 is capable of receiving measurement information from the radio access point 120 one or more times. In an embodiment of the present invention, each of the messages including measurement information transmitted from the radio access point 120 may include measurement information regarding other UE.

The communication entity 300 is capable of storing measurement information by cells of the radio access point 120 and/or measurement information by UE devices in the cells. In this case, cells may be distinguished from each other by cell identifiers (e.g., ECGI or PCI), and UE devices may be distinguished from each other by UE identifiers (e.g., C-RNTI or eNB UE X2AP ID). Although the cell identifiers or UE identifiers show the examples listed above, it should be understood that the present invention is not limited to the examples.

When receiving new measurement information corresponding to UE identified by the same UE and/or the same cell, the communication entity 300 is capable of updating stored measurement information with the newly received measurement information. For example, in a state where a RSRP measurement result for an identifier of a particular cell and/or an identifier of UE was received and stored, when newly receiving an RSRP measurement result for the same cell identifier and/or the same UE identifier, the communication entity 300 is capable of replace the stored RSRP measurement result with the newly received RSRP measurement result. The RSRP measurement result may be used as an input that the communication entity 300 uses to create coordination pattern information (along with information received by the communication entity 300 and/or other information stored in the communication entity 300).

According to another embodiment of the present invention, the measurement information may be managed in such a way that the measurement information items are completely replaced with others or processed as a history by a preset number. For example, the measurement information may be stored or managed by a preset number of items, according to a time when the measurement information is received, a place where the measurement information is received, etc. When the measurement information is received, exceeding a preset number of items, it may be removed from the oldest information from the channel measurement history.

Frequency transmission of measurement information may drive the communication entity 300 hard. Since the reception of measurement information needs the calculation ability and the process of received measurement information to create a coordination pattern also needs the calculation ability, frequency reception of measurement information is likely to cause an overload in the communication entity 300. In order to prevent the problem, the communication entity 300 may employ a timer. The timer may be a timer set to the inside of the communication entity 300 or may be a timer received from another network entity (e.g., MME). When receiving the measurement information from the radio access point 120, the communication entity 300 is capable of starting the timer. After that, the communication entity 300 may ignore measurement information that has been received until the expiration of the timer.

Figure 7:
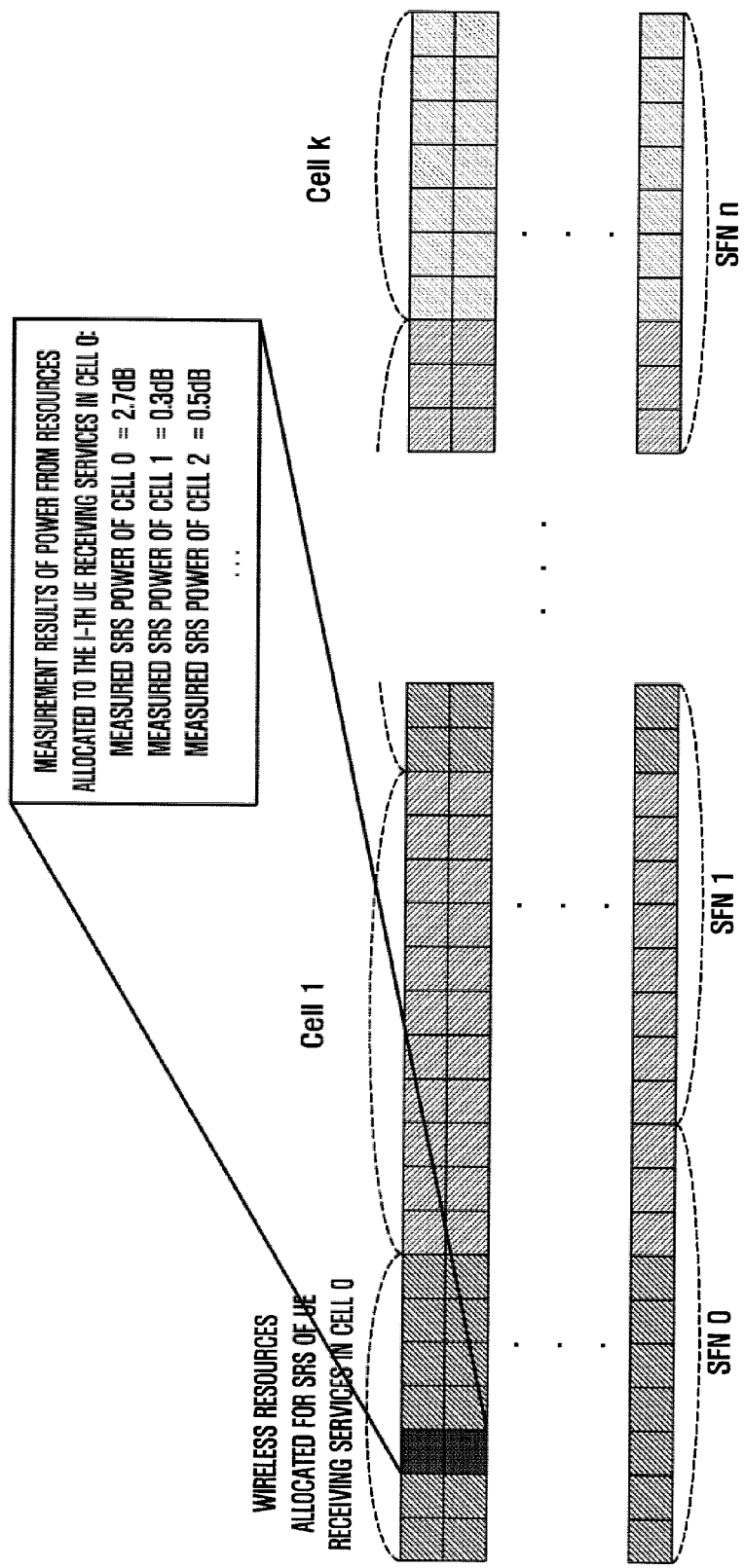
FIG. 7 is a diagram showing an example of information regarding measurement power of SRS of UE that a communication entity 300 receives from a number of radio access points.

FIG. 7 is a diagram showing an example of information regarding measurement power of SRS of a UE device that a communication entity 300 receives from a number of radio access points.

As shown in FIG. 7, in a state where UE devices receives services in Cell 0 and wireless resource are allocated for SRS of the UE devices, the results that the respective cells measured in a wireless resource allocated to i-th UE device from among the wireless resources may differ from each other. Referring to FIG. 7, the measurement results of Cell 0, Cell 1 and Cell 2 are 2.7 dB, 0.3 dB and 0.5 dB, respectively. The i-th UE has the best channel state with the serving cell. The i-th UE interferes, but not too seriously, with Cell 1 and Cell 2 adjacent to the serving cell. The i-th UE interferes more with Cell 2 than Cell 1. For example, when UE has an SRS measurement result of Cell1, 4 dB, which is better than that of a serving cell, the UE may interfere seriously with the adjacent cell.

Referring back to FIG. 5, the communication entity 300 creates coordination patterns between radio access points in operation 545. The communication entity 300 may use channel information regarding the UE 100 received from the radio access point 120 to create coordination patterns between radio access points. The channel information regarding UE may refer to information obtained as SRS transmitted from the UE is measured.

The communication entity 300 is capable of creating coordination patterns based on various channel information regarding the UE 100 transmitted as in operation 540, regardless of a Transmission Mode (TM) number (or without the consideration of a TM number). For example, the communication entity 300 is capable of deriving the channel state of the UE 100 less than TM 9 by using at least one of the following:

SRS power measured by the radio access point 120 from the UE;

measurement result by UE 100 from resources configured in CSI-RS-Config; and measurement result of CRS by UE 100.

The communication entity 300 is also capable of deriving the channel state of the UE 100 above TM 10 by using at least one of the following:

SRS power measured by the radio access point 120 from the UE;

measurement result by UE 100 from resources configured in CSI-RS-ConfigNZP;

measurement result by UE 100 from resources configured in CSI-IM-Config;

measurement result of CRS by UE 100; and result of a combination of the measurement result by UE 100 from resources configured in CSI-IM-Config and the measurement result by UE 100 from resources configured in CSI-RS-ConfigNZP.

The communication entity 300 is capable of transmitting coordination pattern information (CoMP hypothesis) to the radio access point 120 in operation 550. The coordination pattern information may refer to information regarding resource allocation (hypothesis) to a cell that belonged to the radio access point 120 and/or cells in the vicinity of the cell. The coordination pattern information may be transmitted via a message, LOAD INFORMATION. The message transmitting coordination pattern information may also transmit a benefit metric. The benefit metric refers to a gain estimated from a cell at the sending party or the entire cluster when allocation of resources to respective cells and/or management of wireless resources are/is performed based on corresponding coordination pattern information. For the sake of convenience, the term 'coordination pattern information' and/or 'benefit metric' is called 'CoMP Information'.

The communication entity 300 is capable of transmission of SRS power that is measured from a number of UE devices and received from other radio access points. The radio access point 120 is capable of estimating what level of intensity other radio access points receive SRS of the UE 100 that the radio access point 120 is providing services to, via the SRS power measured by other radio access points. The radio access point 120 is capable of deriving the channel state and interference condition of the UE 100 based on the estimations. The radio access point 120 is capable of managing wireless resources of the UE 100, based on at least one of the following: SRS power measured by other radio access points and the coordination patterns.

According to an embodiment of the present invention, operation 550 where the communication entity 300 transmits coordination pattern information to the radio access point 120 may be performed after the communication entity 300 receives, from the radio access point 120, an indication for requesting transmission of coordination pattern information. For example, the communication entity 300 receives a request for transmitting coordination pattern information from the radio access point 120 and then transmits the coordination pattern information to the radio access point 120.

The process of receiving an indication from the radio access point 120 may be performed via Load Indication. After receiving the indication, the communication entity 300 responds to the radio access point 120, depending on a condition as to whether the communication entity 300 may support coordination between radio access points. For example, when the communication entity 300 is capable of supporting coordination between radio access points (via a method of activating coordination between radio access points, etc.), it transmits coordination pattern information to the radio access point 120. On the contrary, when the communication entity 300 is not capable of supporting coordination between radio access points (due to various causes, e.g., by deactivating coordination between radio access points), it may transmit, to the radio access point 120, information indicating that it cannot support coordination between radio access points (or that coordination between radio access points has been deactivated).

Examples of the method of informing that the communication entity is not capable of supporting coordination between radio access points are a notification method using an indicator, a method indicating that coordination between radio access points is not supported when the range of information element, CoMP Information Item, is zero, etc.

The following table 8 shows that the indicator is CoMP Inactive as information element and a case where the range of CoMP Information Item is 0 is allowed. According to an embodiment of the present invention, it is preferable that one of the conditions (an indicator of CoMP Inactive as information element and a case where the range of CoMP Information Item is 0) is used.

TABLE 8

| IE | Presence | Range | IE type | Semantics description |
|---|---|---|---|---|
| CoMP Information Item | | {or} ... <maxnoofCoMPInformation> | | |
| >CoMP Hypothesis Set | M | | | |
| >Benefit Metric | M | | | |
| ... | ... | ... | ... | ... |
| CoMP Inactive | O | | ENUMERATED (true, ...) | |

According to an embodiment of the present invention, when the communication entity 300 cannot support coordination between radio access points, it transmits, to the radio access point 120, information element (IE) for transmitting coordination pattern information, with empty (NULL), as shown in the following table 6, thereby letting the radio access point 120 to know that the communication entity 300 cannot support coordination between radio access points.

TABLE 6

| IE | IE type | Semantics description |
|---|---|---|
| CHOICE CoMP Hypothesis Information | | |
| >CoMP Hypotheses | | |
| >CoMP Inactive | NULL | Indicates that coordination by means of inter-eNB CoMP is not active |

Referring to table 6, IE containing coordination pattern information is named CoMP Hypothesis Information; however, it may also be named a general term as described in the following table 7, considering that coordination pattern information may be transmitted along with benefit metric.

When the radio access point 120 receives, from the communication entity 300, information element (NULL CoMP Information or an indicator) informing that coordination between radio access points is not supported or does not receive CoMP Information (e.g., Range=0), the radio access point 120 perceives that coordination between radio access points is not supported and my not transmit, to the communication entity 300, an indication for requesting transmission of CoMP Information for a certain period of time.

When the radio access point 120 is notified that coordination between radio access points is not supported, it may determine the validity of received CoMP information as the CoMP information has no longer been valid since a specific time point. The specific time point refers to a time right after the CoMP Information is received. The specific time point may refer to any other time point, for example, the forthcoming subframe(s), number n. The specific time point may also refer a time point (system frame number and/or subframe number) that a message transmitting CoMP Information (e.g., LOAD INFORMATION message) is applied. In the present disclosure, subframe(s) n may refer to:

TABLE 7

| IE | Presence | Range | IE type | Semantics description |
|---|---|---|---|---|
| CHOICE CoMP Information | M | | | |
| >CoMP Information Item | | 1 ... <maxnoofCoMPInformation> | | |
| >>CoMP Hypothesis Set | M | | | |
| >>Benefit Metric | M | | | |
| ... | | ... | ... | ... |
| >CoMP Inactive | | | NULL | Indicates that coordination by means of inter-eNB CoMP is not active | subframe 0;
subframe 0 and subframe 5; and
subframe 0, subframe 2, subframe 4, subframe 6 and subframe 8.

In addition, subframe(s) may also be called subframes numbered one or more integers. Although subframe number n is not explicitly standardized, it will be appreciated that subframe n may be set particularly, according to network service providers, regions, etc. In order for CoMP processes to create advantages for the network performance, synchronized CoMP Information needs to be applied and thus a definite standard for an available period is required.

Various embodiments for determining since when the received CoMP Information is not valid may correspond to a method for determining since when CoMP Information received by the radio access point 120 is valid.

More specifically, the radio access point 120 is capable of determining that the CoMP Information is valid:
 a time right after the CoMP Information is received; or
 from the forthcoming subframe(s) n; or
 since a time point (system frame number and/or subframe number) that a message transmitting CoMP Information (e.g., LOAD INFORMATION message) is applied.

The expression that CoMP Information is valid since a time point may refer to the sense that the radio access point 120 and/or the communication entity 300 uses CoMP Information for management of wireless resources since the time point.

When a message transmitting CoMP Information is a message that is transmitted without the need of a particular period or a designation/request procedure, e.g., LOAD INFORMATION, it is difficult for the receiving party 120 to determine until when CoMP Information is valid, without a definite standard. Therefore, a standard for an available period of CoMP Information between the communication entity 300 and the radio access point 120 is required.

To this end, the communication entity 300 and the radio access point 120 are capable of taking one of the following standards and performing corresponding operations. For example, according to an embodiment of the present invention, the radio access point 120 may determine that received CoMP Information is valid until one of the following periods:
 a time point when newly, additionally received CoMP Information starts to be valid;
 a period of time that can be derived from received CoMP Information.

When determining that received CoMP Information is valid until a time point when newly, additionally received CoMP Information starts to be valid, the radio access point 120 may repeatedly consider CoMP Information into management of wireless resources. For example, when the communication entity 300 provides CoMP Information of 10 ms, the radio access point 120 considers the CoMP Information to be valid for 10 ms and considers the CoMP Information into management of wireless resources. When the radio access point 120 does not receive new CoMP Information during the period of time or after the period of time has elapsed, it may repeat the application of the received CoMP Information.

The method described above requires the communication entity 300 to inform the radio access point 120 of the operation when it does not make coordination between radio access points. However, when the communication entity 300 does not information the radio access point 120 of the operation, the radio access point 120 may continuously consider the received CoMP Information into management of wireless resources.

To this end, when the communication entity 300 does not make coordination between radio access points, it may transmit, to the radio access point 120: information element (NULL CoMP Information or an indicator) informing that coordination between radio access points is not supported; or a message (e.g., LOAD INFORMATION) without containing CoMP Information (e.g., Range=0), where the message (e.g., LOAD INFORMATION) is used to transmit CoMP Information.

When determining that received CoMP Information is valid until a period of time that can be derived from the received CoMP Information, the radio access point 120 does not need to repeatedly consider the received CoMP Information into management of wireless resources. In this case, since the CoMP Information is applied once, the communication entity 300 may not need to information that coordination between radio access points is not supported. For example, when the communication entity 300 provides CoMP Information of 10 ms, the radio access point 120 considers the CoMP Information to be valid for 10 ms and considers the CoMP Information into management of wireless resources. The radio access point 120 no longer uses the CoMP Information.

The CoMP Information IE transmitting the benefit metric and/or the coordination pattern information received by the radio access point 120 is determined to be valid before new CoMP Information IE is received.

Although the UE 100 is UE less than TM 9 that is not capable of uploading a report for CSI-RS allocated to a number of RE sets or groups, the radio access point and the communication entity, according to the first embodiment described above, are capable of detecting the channel states and interference conditions of the UE by using the SRS transmitted by the UE, and making coordination between radio access points based on the channel states and interference conditions.

For particular UE, the present invention does not make coordination between radio access points. More specifically, the present invention makes coordination between radio access points for one of the wireless resources, but does not make coordination between radio access points for other part of the wireless resources. The UE, not related to coordination between radio access points, may be called at least one of the following: UE less than TM 9, UE less than TM 8, UE including an indicator that does not participate in coordination between radio access points, roaming UE, and UE with a low priority. Since UE considered when wireless resources are managed is in a connection state, the UE may be a management object of wireless resources in a connection state.

Figure 8:
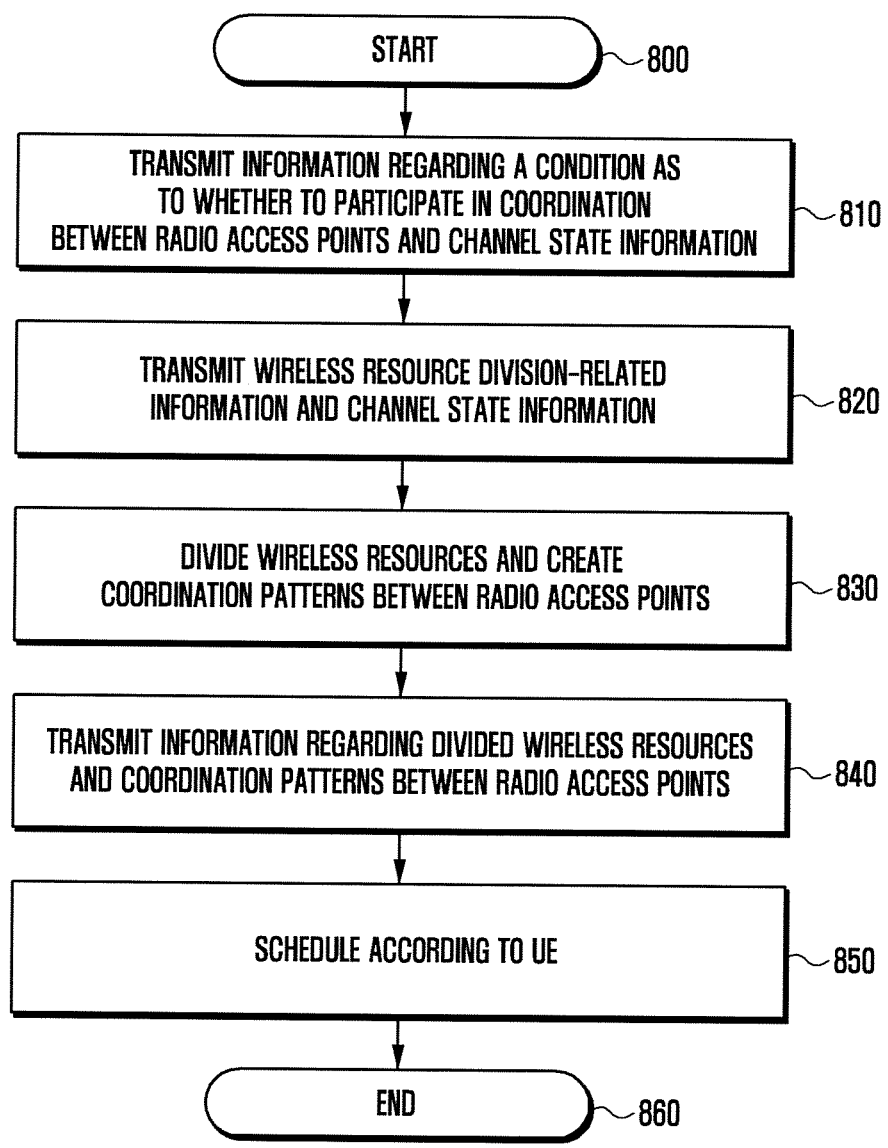
FIG. 8 is a flow diagram showing a method of dividing wireless resources to coordinate radio access points.

FIG. 8 is a flow diagram showing a method of dividing wireless resources to coordinate radio access points.

The larger the ratio of the number of UE devices, not related to coordination between radio access points, to the total number of UE devices, the larger the ratio of the amount of wireless resources that do not make coordination between radio access points to the amount of wireless resources that make coordination between radio access points.

To this end, UE 100 transmits, to the radio access point 120, information regarding a condition whether it participates in coordination between radio access points in operation 810. The radio access point 120 collects the information from the UE and transmits, to the communication entity 300, information (e.g., wireless resource division-related information and channel state information) that may be used to divide wireless resources according to a condition as to whether to make coordination between radio access points in operation 820.

The communication entity 300 divides wireless resources and creates coordination patterns between radio access points in operation 830. After that, the communication entity 300 transmits, to the radio access point 120, information regarding the wireless resource division and information regarding the coordination patterns in operation 840. The radio access point 120 schedules the UE, based on the information transmitted from the communication entity 300 in operation 850.

In the following description, a second embodiment of the present invention is explained in detail.

Figure 9:
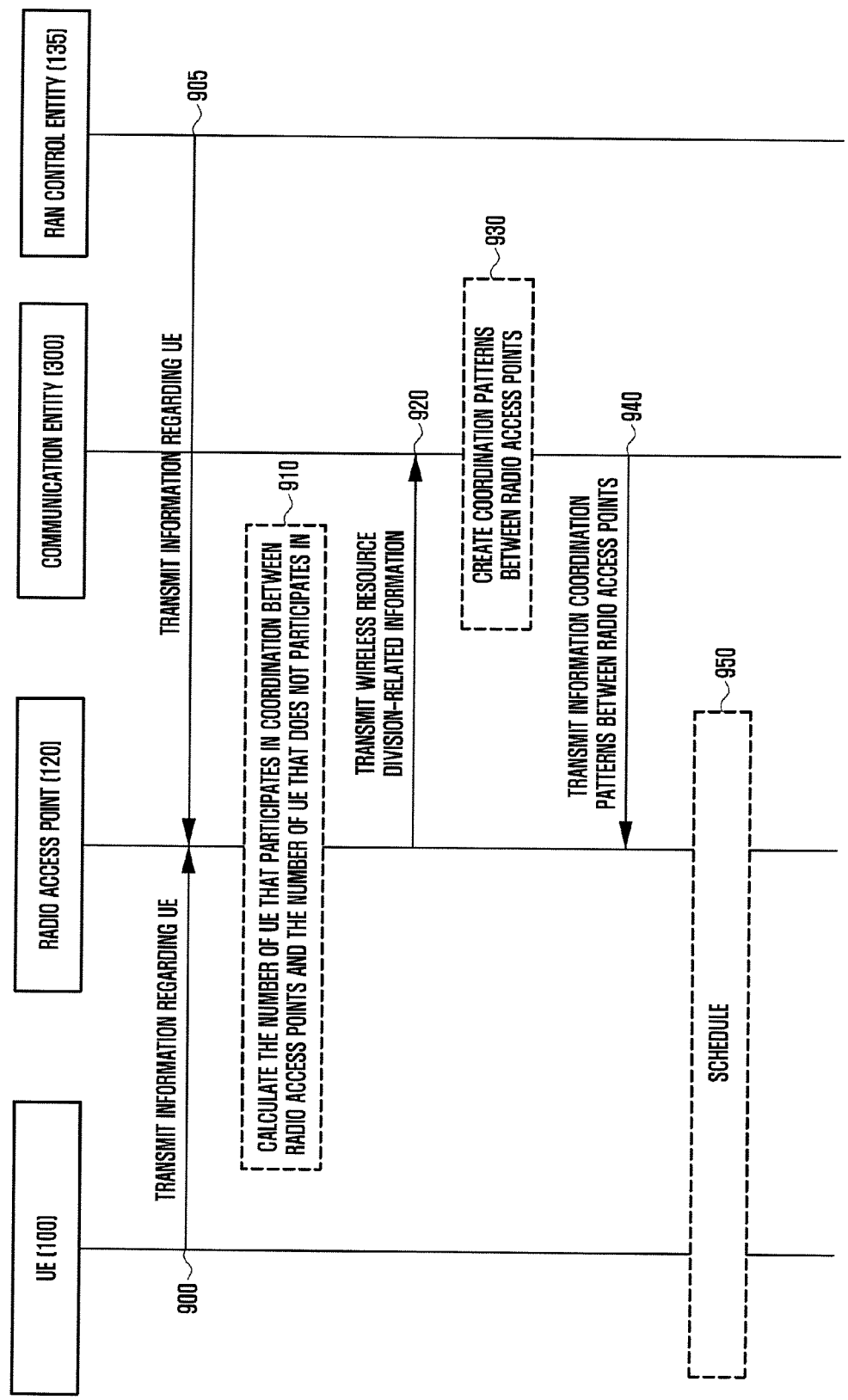
FIG. 9 is a flow diagram showing a second embodiment of the present invention.

FIG. 9 is a flow diagram showing a second embodiment of the present invention.

UE 100 is capable of transmitting information regarding the UE 100 to the radio access point 120 in operation 900. In the embodiment, the information regarding the UE 100 may include at least one of the following:
 a condition as to whether UE performs roaming; and
 a condition as to whether UE participates in making coordination between radio access points.

The condition as to whether UE performs roaming may be expressed by one or more of the following: one bit indicator indicating whether roaming is performed, and Pubic Land Mobile Network (PLMN) as unique feature of the UE 100. The PLMN of the UE 100 may be included in International Mobile Subscriber Identity (IMSI).

The condition as to whether UE participates in making coordination between radio access points may be transmitted in the form of one-bit indicator. Although the UE is suitable for coordination between radio access points, the channel state information and the interference condition of the UE are more frequently reported when the UE participates in coordination between radio access points than when the UE does not participate in coordination between radio access points. In order to reduce the power or resource consumption during the reporting of the channel state information and the interference condition, the UE 100 is capable of displaying a mark indicating that it does not participate in coordination between radio access points.

The information may be transmitted from the UE 100 to the radio access point 120 via one or more of the following messages:
 RRCConnectionSetupComplete, RRCConnectionReconfigurationComplete, and RRCConnetionReestabfishmentRequest.

According to another embodiment of the present invention, the information, transmitted from UE 100 to the radio access point 120 in operation 900, may be transmitted from the RNA control entity 135 to the radio access point 120. That is, the RNA control entity 135 is capable of transmitting, to the radio access point 120, one or more of the following: a condition as to whether to performing roaming and a condition as to whether to make coordination between radio access points, in operation 905.

Part of the information may be included in UERadioAccessCapabilitylnformation IE. The information may also be transmitted via at least one of the following messages: RRC, S1, and X2, which include the IE.

The radio access point 120 calculates the number of UE that participates in coordination between radio access points and the number of UE that does not participates in coordination between radio access points in operation 910. To perform the calculation, the radio access point 120 may consider the information received in operation 900 and/or operation 905.

The radio access point 120 is capable of transmitting information to be used for division of wireless resources to the communication entity 300 in operation 920. The information may include at least one of the following:
 the ratio of the number of UE devices that participate in coordination between radio access points to the total number of UE devices;
 the ratio of the number of UE devices that do not participate in coordination between radio access points to the total number of UE devices;
 the ratio of the amount of data to be transmitted to the entire UE to the amount of data to be transmitted to the UE devices that participate in coordination between radio access points;
 the ratio of the amount of data to be transmitted to the entire UE to the amount of data to be transmitted to the UE devices that do not participate in coordination between radio access points;
 the ratio of the proper amount of wireless resources allocated to the UE devices that participate in coordination between radio access points to the total available amount of wireless resources; and
 the ratio of the proper amount of wireless resources allocated to the UE devices that do not participate in coordination between radio access points to the total available amount of wireless resources.

According to an embodiment, the ratios may be expressed in percentage.

When calculating the ratio of the proper amount of wireless resources allocated to the UE devices that participate/do not participate in coordination between radio access points to the total available amount of wireless resources, it may consider one or more of the following: an amount of data stored in the buffers of the radio access point 120 and the UE 100, an amount of data that the UE 100 transmits (in case of considering coordination between UL radio access points) or receives (in case of considering coordination between DL radio access points) for a certain period of time; and the number of UE devices that participate/do not participated in coordination between radio access points.

The communication entity 300 creates coordination patterns between radio access points in operation 930. The coordination patterns between radio access points may be created, considering information received via operation 920 of the embodiment and information received via operation 540 of the first embodiment.

The communication entity 300 is capable of transmitting information regarding coordination patterns between radio access points to the radio access point 120 in operation 940. The information regarding coordination patterns may be information according to cells, information according to subcells, and information by UE devices. More specifically, the coordination patterns may be the following information, expressed in the available wireless resources:
 information indicating, in proper modes, wireless resources that respective cells can use and wireless resources that respective cells should not use;
 information indicating, in proper modes, wireless resources that respective subcells can use and wireless resources that respective subcells should not use; and
 information indicating, in proper modes, wireless resources that respective UE devices can use and wireless resources that respective UE devices should not use.

It should be understood that the amount of wireless resources that one cell can use is the sum of the amount of wireless resources that UE serviced by one cell can use and the amount of wireless resources that the UE should not use is added.

The communication entity 300 is capable of transmitting, to the radio access point 120, information regarding coordination patterns of a cell (cells) that belonged to other radio access point(s) but did not belong to the radio access point 120. Since more detailed resource cooperation or wireless resource management may be additionally performed in the radio access point 120, the radio access point 120 may be provided information regarding coordination patterns of cell (cells) that belonged to other radio access points but did not belong to the radio access point 120. For example, when UE 100 serviced by a radio access point 120 is seriously interfered with a radio access point A, the radio access point 120: does not perform wireless resource management for the UE 100 with respect to a time and a frequency that are allocated to the UE, associating with the radio access point A; or lowers the order of precedence of wireless resource management for the UE 100 with respect to the time and frequency.

According to an embodiment, wireless resources that respective cells can use may be expressed in bitmap. For example, a bitmap has the maximum length of 110 and is configured in such as way as that the respective bits indicate Resource Block (RB) or RB sets or groups in order. In the bitmap, a bit indicating '1' refers to a wireless resource available to cells and a bit indicating '0' refers to a wireless resource not available to cells.

For example, information regarding the coordination patterns may be transmitted in the form shown in the following table 9. Table 9 is an example for information regarding the coordination patterns. It should be understood that information regarding the coordination patterns may also be transmitted in a form that differs from part or all of table 9.

between the communication entity 300 and the radio access point 120 and a time that coordination between radio access points is not considered between the communication entity 300 and the radio access point 120, information regarding at least one of the times may be transmitted. The information may be expressed by one or more of the following: binary bitmaps for time and periodicity. The periodicity may be contained in a message, RESOURCE STATUS REQUEST, to be transmitted. The periodicity may refer to a value of period less than 1000 ms. The radio access point 120 and/or the communication entity 300, assigned the periodicity, may use the periodicity value to determine the interval between two consecutive reports (may be called one or more of the following: a coordination pattern, a channel state, and an interference condition).

In the implicit communication, without transmitting information regarding at least one of following: a time that coordination between radio access points is considered between the communication entity 300 and the radio access point 120; and a time that coordination between radio access points is not considered between the communication entity 300 and the radio access point 120, a message transmitting one or more of the following: a coordination pattern, a channel state, and an interference condition is known based on the time index.

1. For a time index transmitting a message of the communication entity 300 containing coordination patterns, the radio access point 120 perceives that coordination between radio access points is made and performs wireless resource management for UE suitable for coordination between radio access points, based on the received coordination patterns. For a time index that does not transmit a message containing coordination patterns, coordination between radio access points is not performed for at least a corresponding radio access point 120; however, wireless resource management may be performed for UE that is not suitable for coordination between radio access points.

TABLE 9

| IE/Group Name | Presence | Range | IE type and reference | Criticality | Assigned Criticality |
|---|---|---|---|---|---|
| Cell related information | | | | YES | ignore |
| > Cell related information Item | | 1 ... <maxCellineNB> | | EACH | ignore |
| >> Cell ID | M | | ECGI | — | — |
| >> coordination pattern information | O | | BIT STRING (6 ... 110, ... _) | | |
| >> coordination pattern information regarding neighbors | | 0 ... <maxnoofNeighbours> | | | |
| >>> Cell ID | M | | ECGI | | |
| >>> coordination pattern information | M | | BIT STRING (6 ... 110, ...) | | |

The information regarding coordination patterns may be transmitted via RESOURCE STATUS UPDATE and/or LOAD INFORMATION.

Wireless resource division may be performed on the time domain or the frequency domain.

When wireless resource division may be performed on the time domain, information regarding a time considering coordination between radio access points may be explicitly communicated, and may also implicitly communicated with respect to time synchronization between the communication entity 300 and the radio access point 120.

In the explicit communication, from among a time that coordination between radio access points is considered 2. For a time index transmitting information regarding interference conditions and channel states of UE 100 from the radio access point 120 to the communication entity 300, the communication entity 300 perceives that the radio access point 120 would participate in coordination between radio access points, and transmits a message containing coordination patterns in response to the time index. The radio access point 120 performs wireless resource management for UE suitable for coordination between radio access points, based on the received coordination patterns. For a time index that does not transmit information regarding interference conditions and channel states of UE 100 from the radio access point 120 to the communication entity 300, the communication entity 300 perceives that the radio access point 120 would not participate in coordination between radio access points, and does not transmit coordination patterns for the radio access point 120 in response to the time index. In this case, for the purpose of reference, coordination patterns of other radio access points may be transmitted. The radio access point 120 performs wireless resource management for UE that is not suitable for coordination between radio access points.

When wireless resource division may be performed on the frequency domain, the communication entity 300 modifies coordination patterns and transmits the modified coordination patterns to the radio access point 120, thereby notifying the wireless resource division.

It should be understood that the embodiments of the present invention may be modified or altered to form various modifications. For example, coordination patterns may be modified in such a way as to distinguish frequency intervals between applied and not applied for coordination between radio access points.

Figure 10:
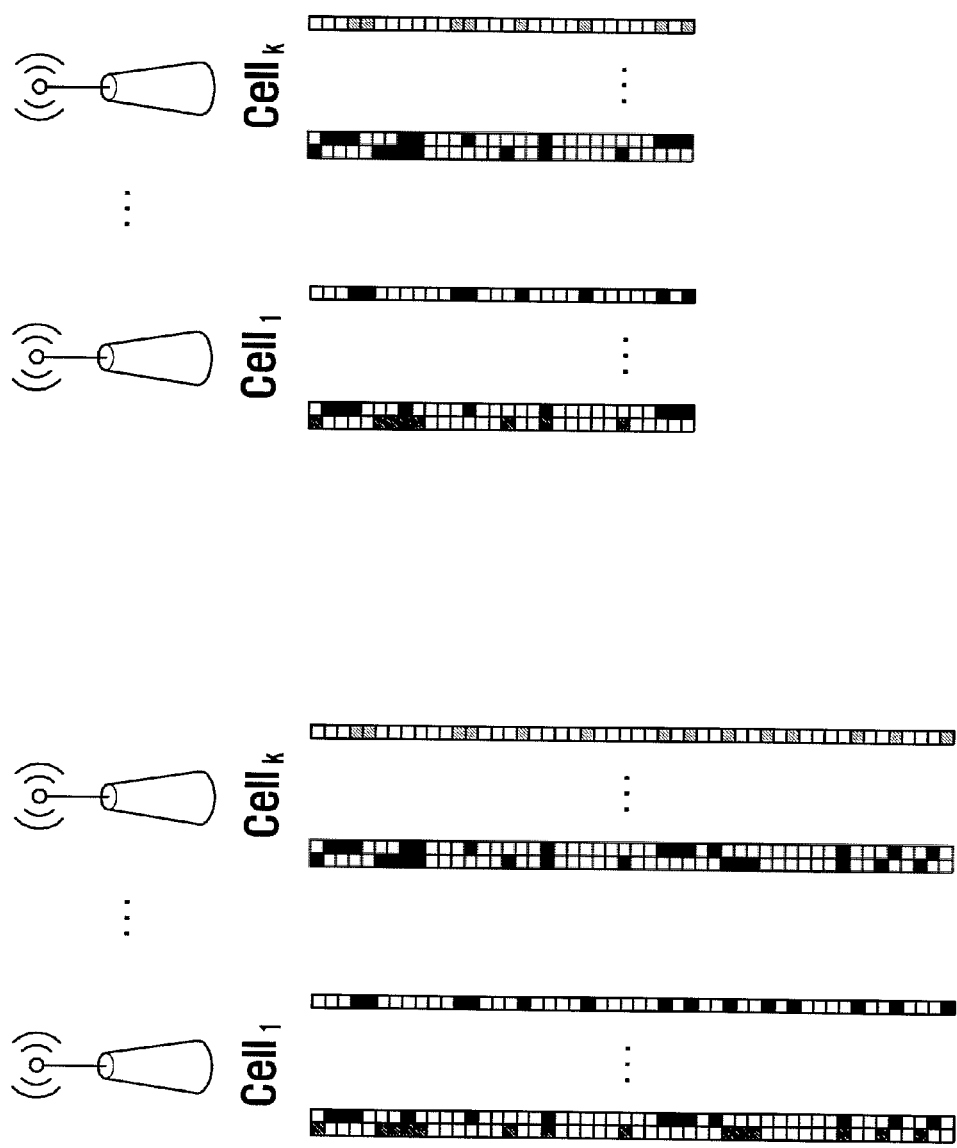
FIG. 10 is a diagram showing an example of a coordination pattern transmitted to a radio access point 120 when wireless resources are divided on the frequency domain.

FIG. 10 is a diagram showing an example of a coordination pattern transmitted to a radio access point 120 when wireless resources are divided on the frequency domain.

Diagram (a) of FIG. 10 shows an example of a coordination pattern transmitted without considering wireless resource division. Coordination patterns for a corresponding cell and the neighbor cells are transmitted to k cells (k, the total number of cells). Coordination patterns are described on all wireless resources available to respective cells and then transmitted thereto.

Diagram (b) of FIG. 10 shows an example of a coordination pattern transmitted with considering wireless resource division on the frequency domain. This example is the same as the left example in that coordination patterns for a corresponding cell and the neighbor cells are transmitted to k cells (k, the total number of cells). However, coordination patterns are described for not all but part of wireless resources available to respective cells, and then transmitted. That is, in diagrams (a) and (b) of FIG. 10, the vertical axes are the frequency axis of listing physical resource blocks (PRBs). The number of PRBs shown in diagram (b) is less than that of PRBs shown in diagram (a). That is, diagram (b) shows only PRBs to which coordination between radio access points can be applied, and that can schedule UE suitable for coordination between radio access points. As shown in FIG. 10, wireless resources which can be used but have not been described are considered that they are not applied for coordination between radio access points; and UE that is not suitable for coordination between radio access points can be managed with wireless resources.

The radio access point 120 manages UE 100 with wireless resources, based on the information received from the communication entity 300 and/or the UE 100 in operation 950.

When coordination patterns are information that indicates, in proper modes, wireless resources that respective cells can use and wireless resources that respective cells should not use, the radio access point 120 may additionally allocate resources according to UE devices. When coordination patterns are information that indicates, in proper modes, wireless resources that respective UE devices can use and wireless resources that respective UE devices should not use, the radio access point 120 may perform wireless resource management.

It should be understood that information added into messages used for the embodiments may also be added to messages that are used for other proper processes or new processes. It should be understood that information added into messages used for the embodiments may be transmitted between the radio access point 120 and the communication entity 300, without the use of separately defined processes.

In the embodiments, all operations and messages may be objects that are selectively performed or omitted. In addition, operations in respective embodiments do not necessarily need to be performed in order but may be performed in any other order. Messages in respective embodiments do not necessarily need to be transmitted in order, but may be transmitted in any other order.

The embodiments of the present invention can make coordination between radio access points although there are UE devices not suitable for reporting various interferences.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method for managing wireless resources by a first communication entity in a wireless communication system, the method comprising:

receiving, from a second communication entity, a first load information message including first coordinated multi-point transmission and reception (CoMP) information;

determining the first CoMP information as valid until an update of second CoMP information, included in a second load information message, is considered valid; and managing the wireless resources based on a result of the determination, wherein the first CoMP information and the second CoMP information include hypothetical resource allocation information for a cell respectively.

2. The method of claim 1, the method further comprising:

applying the first CoMP information to management of the wireless resources repeatedly if the second load information message is not received from the second communication entity.

3. The method of claim 1, wherein the update of the second CoMP information is considered valid:

after the second CoMP information is received;

since a first time point from a second time point that the second CoMP information is received; or if the second CoMP information is assumed to be valid according to validity information included in the second load information message.

4. The method of claim 1, the method further comprising:

receiving a measurement report message from a terminal; and transmitting, to the second communication entity, measurement-related information regarding according to the received measurement report message.

5. The method of claim 4, wherein the first CoMP information includes CoMP hypothesis information regarding coordination patterns generated based on the measurement-related information.

6. A method for managing coordination by a second communication entity in a wireless communication system, the method comprising:

generating first coordinated multi-point transmission and reception (CoMP) information based on measurement-related information received from a first communication entity; and transmitting, to the first communication entity, a first load information message including the first CoMP information, wherein the first CoMP information is determined as valid until an update of second CoMP information, included in a second load information message, is considered valid, and wherein the first CoMP information and the second CoMP information include hypothetical resource allocation information for a cell respectively.

7. The method of claim 6, wherein the first CoMP information is repeatedly applied to management of wireless resources if the second load information message is not transmitted from the second communication entity.

8. The method of claim 6, wherein the update of the second CoMP information is considered valid:

after the second CoMP information is received;

since a first time point from a second time point that the second CoMP information is received; or if the second CoMP information is assumed to be valid according to validity information included in the second load information message.

9. The method of claim 6, the method further comprising:

receiving, from the first communication entity, the measurement-related information regarding according to a measurement report message, wherein the measurement report message is transmitted from a terminal to the first communication entity.

10. The method of claim 6, wherein the first CoMP information includes CoMP hypothesis information regarding coordination patterns generated based on the measurement-related information.

11. A first communication apparatus for managing wireless resources in a wireless communication system, the first communication apparatus comprising:

a transceiver configured to transmit and receive a signal;

a controller coupled with the transceiver and configured to:

receive, from a second communication apparatus, a first load information message including first coordinated multi-point transmission and reception (CoMP) information, and determine the first CoMP information as valid until an update of second CoMP information, included in a second load information message, is considered valid, and manage the wireless resources based on a result of the determination, wherein the first CoMP information and the second CoMP information include hypothetical resource allocation information for a cell respectively.

12. The first communication apparatus of claim 11, wherein the controller is further configured to apply the first CoMP information to management of the wireless resources repeatedly if the second load information message is not received from the second communication apparatus.

13. The first communication apparatus of claim 11, wherein the update of the second CoMP information is considered valid:

after the second CoMP information is received;

since a first time point from a second time point that the second CoMP information is received; or if the second CoMP information is assumed to be valid according to validity information included in the second load information message.

14. The first communication apparatus of claim 11, wherein the controller is further configured to receive a measurement report message from a terminal, and transmit, to the second communication apparatus, measurement-related information regarding according to the received measurement report message.

15. The first communication apparatus of claim 14, wherein the first CoMP information includes CoMP hypothesis information regarding coordination patterns generated based on the measurement-related information.

16. A second communication apparatus for managing coordination in a wireless communication system, the second communication apparatus comprising:

a transceiver configured to transmit and receive a signal; and a controller coupled with the transceiver and configured to:

generate first coordinated multi-point transmission and reception (CoMP) information based on measurement-related information received from a first communication apparatus, and transmit, to the first communication apparatus, a first load information message including the first CoMP information, wherein the first CoMP information is determined as valid until an update of second CoMP information, included in a second load information message, is considered valid, and wherein the first CoMP information and the second CoMP information include hypothetical resource allocation information for a cell respectively.

17. The second communication apparatus of claim 16, wherein the first CoMP information is repeatedly applied to management of wireless resources if the second load information message is not transmitted from the second communication apparatus.

18. The second communication apparatus of claim 16, wherein the update of the second CoMP information is considered valid:

after the second CoMP information is received;

since a first time point from a second time point that the second CoMP information is received; or if the second CoMP information is assumed to be valid according to validity information included in the second load information message.

19. The second communication apparatus of claim 16, wherein the controller is further configured to receive, from the first communication apparatus, the measurement-related information regarding according to a measurement report message, wherein the measurement report message is transmitted from a terminal to the first communication apparatus.

20. The second communication apparatus of claim 16, wherein the first CoMP information includes CoMP hypothesis information regarding coordination patterns generated based on the measurement-related information.

* * * * *